United States Patent [19]
Shultz

[11] Patent Number: 5,848,687
[45] Date of Patent: *Dec. 15, 1998

[54] CD PROTECTOR RING

[76] Inventor: Bradley Shultz, 39191 River Rd., Lebanon, Oreg. 97355

[*] Notice: This patent issued on a continued prosecution application filed under 37 CFR 1.53(d), and is subject to the twenty year patent term provisions of 35 U.S.C. 154(a)(2).

[21] Appl. No.: 771,011

[22] Filed: Dec. 20, 1996

[51] Int. Cl.$^6$ .................................................. B65D 85/57
[52] U.S. Cl. ........................................ 206/308.1; 206/509
[58] Field of Search ........................... 206/308.1, 307, 206/309, 312, 313, 503, 509, 232

[56] References Cited

U.S. PATENT DOCUMENTS

| | | | |
|---|---|---|---|
| 4,144,968 | 3/1979 | Shelton | 206/509 |
| 4,316,281 | 2/1982 | Prusak | 369/291 |
| 4,589,104 | 5/1986 | Brockley | 369/291 |
| 4,736,840 | 4/1988 | Deiglmeier | 206/303 |
| 4,930,636 | 6/1990 | Meadows | 206/503 |
| 5,299,186 | 3/1994 | Tsurushima | 369/291 |

*Primary Examiner*—Jacob K. Ackun
*Attorney, Agent, or Firm*—William S. Lovell; S. Rose Jade

[57] ABSTRACT

A flexible protector ring is provided that can be "snapped" onto the outer periphery of a disc-like recording medium, wherein the outer periphery of the recording medium fits into an annular slot on the inner surface of the protector ring, and the dimension of the protector ring in the direction normal to the plane of that medium/protector ring combination is sufficient to raise the exposed inward and downward surface of the medium far enough above a flat surface onto which the combination is placed to avoid contact with dust and dirt on the table top. The "upper" surface of the protector ring is provided with an annular slot or groove, and the "lower" surface of the protector ring is provided with an annular tip sized to fit within that annular slot or groove of a second protector ring, whereby two or more such medium/protector ring combinations can be stacked one upon the other such that lateral movement of one relative to the other will be precluded.

4 Claims, 2 Drawing Sheets

CD PROTECTOR RING

BACKGROUND OF THE INVENTION

FIELD OF THE INVENTION

This invention relates to methods and apparatus for protecting the recording surface of compact disks (CDs) from damage, and particularly to such methods and apparatus that do not require removal of the apparatus from a CD in order for that CD to be read or written upon in a CD reader and/or writer.

BACKGROUND INFORMATION

The compact disk (CD) has provided means for the digital recording of quantities of digital data that would have been thought to be quite impossible not too many years previously. Such recording technology is makes a major contribution to the entertainment industry in the form of very high quality audio recordings, and also in the computer and computer games industries in the form of digital text, video, and graphics data. In particular, computer programs and related data files that once required dozens of the 3.5 inch, 1.44M (or even 2.88M) data disks to be recorded can now be placed on a single CD to the extent of 680M or more, as can whole encyclopedias and other large collections of books, Broadway shows, operas, and the like. In view of this great utility of CDs, it is not surprising that effort has also been made to develop means for protecting those CDs from accidental damage once they have been recorded.

The CD itself comprises a thin (1.2 mm) circular plastic plate or disk, 12 cm in diameter, that generally has a label side and a recording side on which the data are recorded. Recording is done by burning or otherwise forming pits typically 0.12 micrometers deep and 0.6 micrometers in diameter in circular tracks that are only 1.6 micrometers apart, and the data can then be read by a sharply focused laser beam, wherein transitions between pits and non-pitted locations constitute a logical 1, and the pits and non-pitted locations themselves constitute a logical 0. Any event that would scratch out or fill in those surface pits could destroy the recorded data, perhaps to an extent that the error-correction routines (that are likewise recorded on the disk) could not overcome.

Perhaps the best known device for protecting a CD from damage is the so-called "jewel case," which is simply a rectangular box, generally made of transparent plastic, that includes in the interior thereof a "template" of some soft material that contains an indentation within which the CD may be placed. Although there are some CD readers that can accommodate both the CD and its jewel case, most CD players require that the CD be removed from its case in order to be read. In the latter instance, the CD is necessarily subjected to physical handling from which some physical damage in the form of finger prints or scratches and the like may result. In any case, the types of jewel cases that are typically found in the market place may present difficulty in being opened to retrieve the CD—one side of the case may crack, parts may break off, and in some cases a tool such as a screwdriver must be used in order to open the case, thereby making the likelihood of damage to the CD even more probable.

Users of CDs will generally adapt to the usual requirements for CD care such as avoiding touching the recording surface, typically by handling such CDs by the edges only. However, such users are also likely to place such CDs down upon hard surfaces that may bear a quantity of dust, dirt, and the like. CDs are also likely to be stacked one on the other, and since the admonitions about touching the surface are not generally applied to the label side of the CD, that surface may indeed bear fingerprints and the like that will then come into contact with the recording surface of any CD that is placed thereon with that recording surface down. Dust and dirt that may collect in a fingerprint may be of just the right sub-micrometer size to enter into the pits that constitute the digital data, and subsequent abrasion caused by the one CD sliding over the other may render those data elements ("datels") unreadable.

U.S. Pat. No. 4,736,840 issued Apr. 12, 1988 to Deigimeier describes a protective holder for CDs and the like essentially comprising a circular envelope into which the CD may be inserted, and the CD together with that envelope are then placed within a jewel case. For protection of a CD outside of a jewel case, U.S. Pat. No. 5,299,186 issued Mar. 29, 1994 to Tsurushima describes a cover having a central projecting member that is inserted into the center hole of the CD, which brings into contact with the data recording side of the CD a plate having either a soft material disposed thereon, or alternatively a pair of annular ridges that are disposed to contact the non-recording portions of that recording side while leaving the recording portion untouched but covered over. This device must likewise be removed from the CD in order to read the same, since the device indeed covers the over recording surface of the CD when the latter is placed thereon.

For purposes of protecting the surface of 33 ⅓ RPM "LPs" that are stacked one on the other, U.S. Pat. No. 4,589,104 issued May 13, 1986 to Brockley describes a spacer in the form of a thin, circular plate having a center hole; an annular, upwardly-elevated contour that is coaxial with that center hole; a similarly coaxial, annular, downwardly-extending band; and a circular ridge extending both upwardly and downwardly at the periphery of the plate. A first LP rests atop the elevated contour and the upwardly extending portion of the circular ridge of a first spacer, and a second spacer placed thereabove rests thereon such that the downwardly-extending band rests on the LP itself (inwardly from the recording surface) and the downwardly-extending ridge of the second spacer rests on the upwardly-extending ridge of the first spacer.

In U.S. Pat. No. 4,316,281 issued Feb. 16, 1982 to Prusak, a spacer for video discs and the like is described that includes a flat, circular, relatively rigid plate having opposed major surfaces and a central hole therethrough. The plate has portions around both its peripheral edge and the edge of the hole that are thicker than the rest of the plate and project beyond the major surfaces of the plate. The thicker portions of the spacer engage unrecorded surface portions of adjacent recorded discs so as to provide spacing therebetween.

It has occurred to the present inventor, however, that there remains a need for a devices that would provide adequate protection of the recording surface of a CD of much simpler construction and, more importantly, could be installed on a CD on a semi-permanent basis, by which is meant that such a protective device could be left associated with the CD as the same is either played within a CD player or removed therefrom for storage or, as will frequently be the case, is placed down on desk or table surfaces that may be dirty or is left lying about with other CDs or jewel cases being placed thereon. The present specification and drawings disclose such a protective device in the form of a CD protector ring.

SUMMARY OF THE INVENTION

The invention comprises a device for protecting the recorded surface of CDs consisting essentially of an annular ring made of material that is sufficiently flexible to be "snapped" over the peripheral edge of a CD. The inner circumference of the ring includes a slot adapted to accept the peripheral edge of the CD, and the ring further includes upwardly- and downwardly extending portions of a dimension adequate to hold a lower (recorded) surface of such a CD out of contact with a surface such as a table top, and also to separate two or more CDs that are so equipped and are stacked one on the other. The outwardly (i.e., upwardly or downwardly) directed faces of those upwardly- and downwardly-extending portions of the device also include respectively a V-shaped groove or the like and a V-shaped extension or the like, or vice versa, whereby one CD protector ring having a CD disposed therein may be placed atop another CD protector ring having a CD disposed therein, the V-shaped extension of the one ring engaging the V-shaped groove of the other, for convenience in forming an aligned stack thereof and in preventing one CD with attached ring from sliding laterally over another CD with attached ring.

BRIEF DESCRIPTION OF THE DRAWINGS

The preferred embodiments of the invention will now be described in detail with reference to the accompanying drawings, in which.

DETAILED DESCRIPTION OF THE INVENTION

Figure 1:
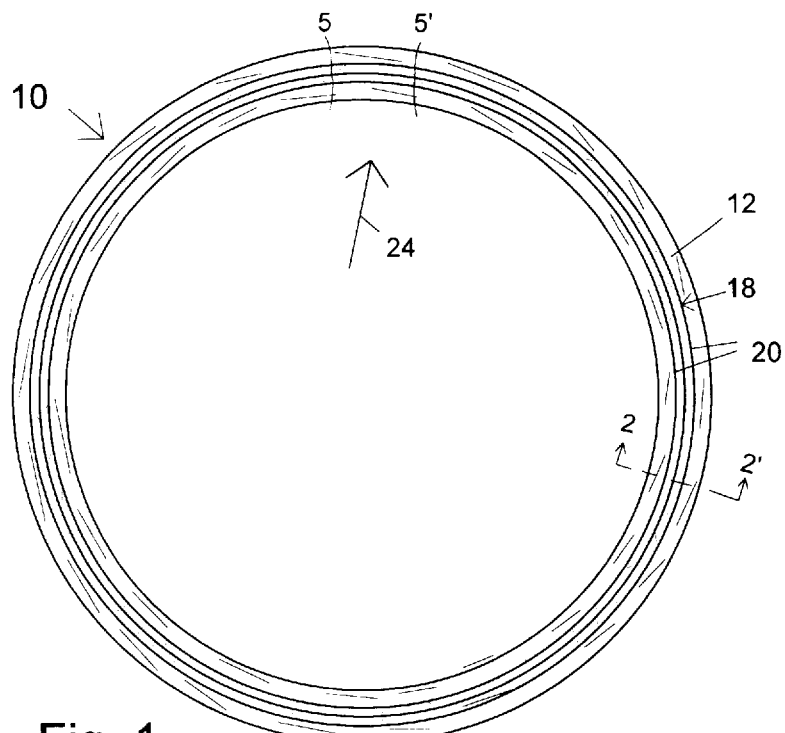
FIG. 1 is a top plan view of the CD Protector Ring.
Figure 3:
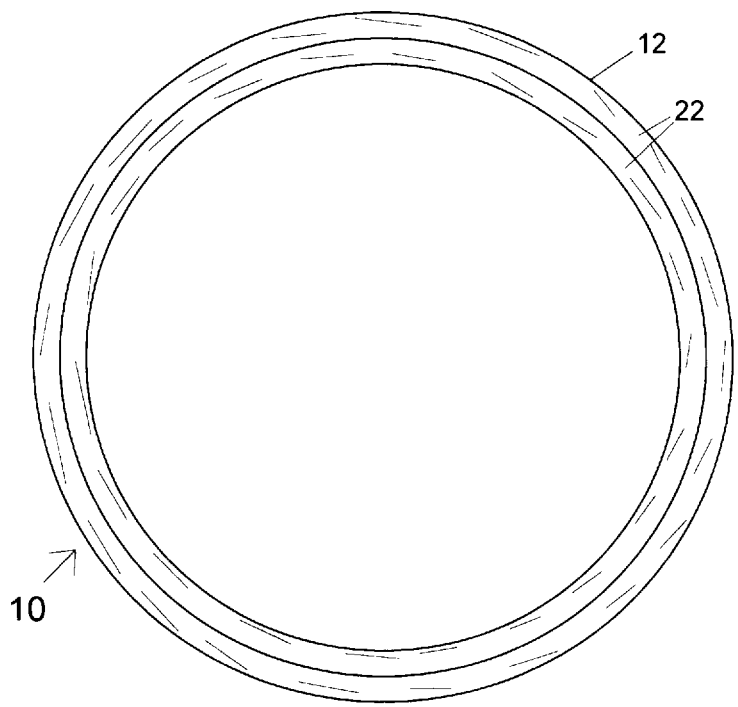
FIG. 3 is a bottom plan view of the CD Protector Ring of FIG. 1.
Figure 2:
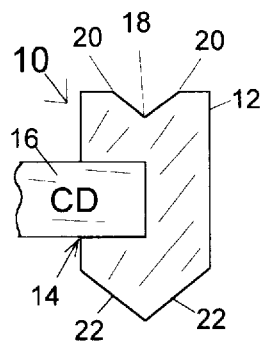
FIG. 2 is a cross-sectional view of a portion of the CD Protector Ring of FIG. 1 taken through the line 2–2' thereof.
Figure 5:
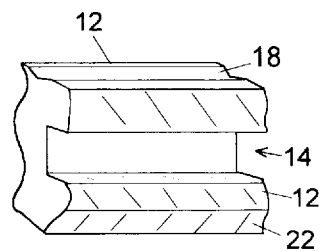
FIG. 5 is a partially oblique side view of a portion of the inner circumference of the CD Protector Ring of FIG. 1, taken in the direction of arrow 24 of FIG. 1 over the portion 5–5'.
Figure 4:
FIG. 4 is a side elevation view of the CD Protector Ring of FIG. 1.

FIG. 1 is a top plan view of CD Protector Ring 10 comprising the invention, which has the basic form of an annular ring 12 as shown in FIG. 1 and is somewhat akin to a rather wide and thick rubber band. As shown in larger scale in FIGS. 2 and 5, around the inner circumference of ring 12 is disposed an elongate slot 14 that is sized to accept the outer periphery 16 of a CD, the latter being shown in FIG. 2 as being disposed therein. The depth of slot 14 is established such that no portion of CD Protector Ring 10 extends inwardly relative to an installed CD so as to encroach upon the recording surface of that CD, i.e., CD Protector Ring 10 is sized so as to contact only the outer rim region of a CD whereon no recording of data occurs. Upper and lower edges of annular ring 12 respectively include on one such edge a V-shaped slot 18 that extends circumferentially all the way around ring 10 and has outer edges 20, and along the opposite edge of annular ring 12 is a V-shaped tip 22 that likewise extends circumferentially around ring 10. Of course, slot 18 and tip 22 may optionally be U-shaped, rectangular of any similar such form so long as the forms are "mated," i.e., slot 18 is adapted to accept tip 22 and thereby prevent lateral movement of one ring 10 relative to another when the same are placed one atop the other. FIG. 3 is a bottom plan view of CD Protector Ring 10 of FIG. 1, FIG. 4 is a side elevation view of the CD Protector Ring 10 of FIG. 1, and FIG. 5 is a partially oblique view of a portion of the inner circumference of CD Protector Ring 10, taken in the direction of arrow 24 in FIG. 1 and encompassing the region 5–5' shown therein.

Figure 6:
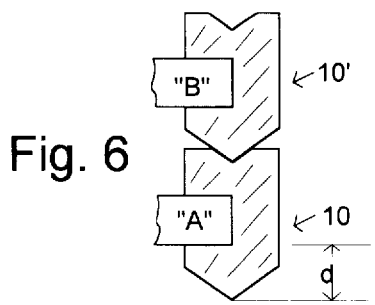
FIG. 6 is a cross-sectional view of a portion of a CD Protector Ring including a CD onto which has been placed another CD Protector Ring also including a CD.

FIG. 6 shows in larger scale (and with the numerical designations of FIG. 5 deleted for clarity) the rightward end of one instance of CD Protector Ring 10 onto which a second instance (designated as CD Protector Ring 10') has been placed, whereby the respective CDs "A" and "B" contained therein have been separated. The distance "d" shown in FIG. 6 represents the upward distance that a CD placed within CD Protector Ring 10 will be raised when placed on a flat surface, and it is advantageous for that dimension of CD Protector Ring 10 to be established such that the distance "d" will be larger than the anticipated dimensions of dust and dirt particles from which the CD is to be protected, but at the same time that distance "d" should not be made so large as to remove the CD from a proper focus of the reading head, as can easily be determined.

Although emphasis in the foregoing discussion has been placed on CDs, it is contemplated that a like application of the principles of CD Protector Ring 10 may be applied to the protection of various types of disk-like recording media such as LP records, video discs, and similar such devices. A device such as an LP record bears a recording region on the upper surface thereof, as opposed to the "lower" surface utilized in reading a CD, but protection of the former recording region is again provided inasmuch as the upper one of a pair of stacked LPs is precluded from making contact with the recording region of the lower LP. Also, illustration of an essentially rectangular slot 18 is not intended to suggest that such a structure is required, especially in that the inner surface of a slot 18 may be advantageously rounded so as to better fit the typically rounded outer periphery of a CD, video disc or the like.

It will be understood by those of ordinary skill in the art that other arrangements and disposition of the aforesaid components, the descriptions of which are intended to be illustrative only and not limiting, may be made without departing from the spirit and scope of the invention, which must be identified and determined only from the following claims and equivalents thereof.

I claim:

1. A disc protector ring for protecting disc-like recording media from physical damage as from dust particles, each of said recording media having a predetermined recordable region on at least one side thereof, a predetermined thickness, a predetermined medium diameter, and a circular periphery, wherein said predetermined recordable region extends outwardly in the direction of said medium diameter to a distance less than said medium diameter, thereby to define about said periphery of said recording medium an annular non-recordable band having a predetermined band width in the direction of said medium diameter, consisting of:

a planar, flexible annular ring having a predetermined inner diameter and a predetermined outer diameter substantially greater than said inner diameter;

an elongate slot coplanar with said ring disposed around said inner diameter, said slot having a predetermined thickness; and in a direction normal to said plane of said annular ring, upper and lower extensions on opposite sides of said elongate slot, whereby upon placing a recording medium within said protector ring and placing said recording medium and said protector ring onto a flat surface that is coplanar therewith such that said recordable region faces said flat surface, said recordable region will be raised above said flat surface.

2. The protector ring of claim 1 further including:

an annular slot having predetermined dimensions on an upper surface of said upper extension of said protector ring; and an annular tip on a lower surface of said lower extension disposed oppositely to said annular slot and having predetermined dimensions that mate to said predetermined dimensions of said slot, whereby placing a first medium to be protected as installed within a first protector ring downwardly onto a second medium to be protected as installed within a second protector ring, said annular tip of said first protector ring will engage said annular slot of said second protector ring.

3. A recording medium comprising:

a recording disc having a predetermined recordable region on at least one side thereof, a predetermined thickness, a predetermined disc diameter, and a circular periphery, wherein said recordable region extends outwardly in the direction of said disc diameter to a distance less than said disc diameter, thereby to define about said periphery of said recording medium an annular non-recordable band having a predetermined band width in the direction of said disc diameter; and a protector ring removably attached around said circular periphery, said protector ring further comprising:

a planar, flexible annular ring having a predetermined inner diameter nearly equal to said diameter of said recording media and a predetermined outer diameter substantially greater than said diameter of said recording media;

an elongate slot coplanar with said ring disposed around said inner diameter, said slot having a thickness nearly equal to said predetermined thickness of said recording media and a depth in the direction from said inner diameter towards said outer diameter less than said band width; and in a direction normal to said plane of said circular ring, upper and lower extensions on opposite sides of said elongate slot.

4. The recording medium of claim 3 further comprising:

an annular slot having predetermined dimensions on an upper surface of said upper extension of said protector ring; and an annular tip on a lower surface of said lower extension disposed oppositely to said annular slot and having predetermined dimensions that mate to said predetermined dimensions of said slot, whereby placing a first said recording medium downwardly onto a second said recording medium said annular tip of said first recording medium will engage said annular ring of said second recording medium.

* * * * *